United States Patent
Koskinen et al.

(10) Patent No.: US 12,261,673 B2
(45) Date of Patent: Mar. 25, 2025

(54) METHOD AND APPARATUS FOR RESOURCE ALLOCATION

(71) Applicant: NOKIA SOLUTIONS AND NETWORKS OY, Espoo (FI)

(72) Inventors: Henri Markus Koskinen, Espoo (FI); Dawid Koziol, Glogow (FI); Esa Mikael Malkamaki, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 519 days.

(21) Appl. No.: 17/295,952

(22) PCT Filed: Nov. 27, 2018

(86) PCT No.: PCT/EP2018/082650
§ 371 (c)(1),
(2) Date: May 21, 2021

(87) PCT Pub. No.: WO2020/108737
PCT Pub. Date: Jun. 4, 2020

(65) Prior Publication Data
US 2021/0399789 A1    Dec. 23, 2021

(51) Int. Cl.
*H04B 7/155* (2006.01)
*H04L 45/128* (2022.01)
*H04W 40/24* (2009.01)
*H04W 76/14* (2018.01)

(52) U.S. Cl.
CPC ..... *H04B 7/15528* (2013.01); *H04L 45/1287* (2013.01); *H04W 40/248* (2013.01); *H04W 76/14* (2018.02)

(58) Field of Classification Search
CPC .......... H04B 7/15528; H04W 76/14; H04W 40/248; H04L 45/1287
USPC ........ 370/315, 328, 329, 338, 341, 345, 350
See application file for complete search history.

(56) References Cited

U.S. PATENT DOCUMENTS

| 10,021,521 B1 | 7/2018 | Reeves et al. | |
| 2011/0249610 A1* | 10/2011 | Ho | H04L 69/04 |
| | | | 370/328 |
| 2019/0349079 A1* | 11/2019 | Novlan | H04B 7/15542 |

FOREIGN PATENT DOCUMENTS

WO    WO 2018/175817 A1    9/2018

OTHER PUBLICATIONS

"3rd Generation Partnership Project; Technical Specification Group Radio Access Network; Study on Integrated Access and Backhaul; (Release 15)", 3GPP TR 38.874 v0.7.0, (Nov. 26, 2018), 110 pages.

(Continued)

*Primary Examiner* — Nghi H Ly
(74) *Attorney, Agent, or Firm* — ALSTON & BIRD LLP

(57) ABSTRACT

A relay node within a network, the network further comprising at least one donor node coupled to the relay node, and a mobile termination coupled to the relay node and at least one donor node, the relay node comprising means for: receiving a configuration message; configuring the relay node, based on the configuration message, to perform at least one of: receiving packets from the mobile termination and originating from one of the donor nodes; and sending packets to one of the donor nodes by transmitting them to the mobile termination.

17 Claims, 9 Drawing Sheets

(56) References Cited

OTHER PUBLICATIONS

AT&T et al., "New SID Proposal: Study on Integrated Access and Backhaul for NR", 3GPP TSG RAN Meeting #78, RP-172290, (Dec. 18-21, 2017), 5 pages.

Ericsson et al., "TP to TR 38.874: Using F1 Functionality to Support Redundant Paths", 3GPP TSG RAN WG3 Meeting #102, R3-186747, (Nov. 12-16, 2018), 6 pages.

Ericsson, "Setup Procedures for IAB-Node and a UE Connected to an IAB Node", 3GPP TSG-RAN WG3 #100, R3-182780, (May 21-25, 2018), 8 pages.

International Search Report and Written Opinion for Patent Cooperation Treaty Application No. PCT/EP2018/082650 dated Jul. 3, 2019, 13 pages.

Qualcomm Inc., "IAB Topologies", 3GPPT SG RAN WG3 Meeting #100, R3-183565, (May 21-25, 2018), 3 pages.

ZTE, "Summary of Offline Discussion and TP for TR 38.874 on IAB and NSA", 3GPP TSG RAN WG3 Meeting #100, R3-183335, (May 21-25, 2018), 3 pages.

Office Action for European Application No. 18811215.5 dated Nov. 10, 2023, 10 pages.

Redman, T., "Design and Deployment of Overlay Services on LTE Network", Retrieved via the Internet on Nov. 10, 2020 <URL:https://www.ciscolive.com/c/dam/r/ciscolive/US/docs/2016/pdf/BRKSPM-2028.pdf>, (Jul. 10, 2016), 46 pages.

* cited by examiner

METHOD AND APPARATUS FOR RESOURCE ALLOCATION

CROSS-REFERENCE TO RELATED APPLICATIONS

This application is a national phase entry of International Application No. PCT/EP2018/082650, filed Nov. 27, 2018, the entire contents of which are incorporated herein by reference.

FIELD

The present application relates to a method, apparatus and computer program and in particular but not exclusively to a method and apparatus for to be used in a network using integrated access and backhauling.

BACKGROUND

A communication system can be seen as a facility that enables communication sessions between two or more entities such as communication devices, base stations/access points/relay nodes and/or other nodes by providing carriers between the various entities involved in the communications path. A communication system can be provided for example by means of a communication network and one or more compatible communication devices.

In a wireless communication system at least a part of a communication session between at least two stations occurs over a wireless link.

A communication device is provided with an appropriate signal receiving and transmitting apparatus for enabling communications, for example enabling access to a communication network or communications directly with other communication devices. The communication device may access a carrier provided by a station or access point, and transmit and/or receive communications on the carrier.

The communication system and associated devices may operate in accordance with a given standard or specification which sets out what the various entities associated with the system are permitted to do and how that should be achieved. Communication protocols and/or parameters which shall be used for the connection are typically defined.

SUMMARY

According to an aspect, there is provided an relay node within a network, the network further comprising at least one donor node coupled to the relay node, and a mobile termination coupled to the relay node and at least one donor node, the relay node comprising means for: receiving a configuration message; configuring the relay node, based on the configuration message, to perform at least one of: receiving packets from the mobile termination and originating from one of the donor nodes; and sending packets to one of the donor nodes by transmitting them to the mobile termination.

The mobile termination may be part of one of: a user equipment; and an integrated access and backhaul node.

The means for configuring the relay node to perform sending packets to one of the donor nodes by transmitting them to the mobile termination may be for establishing an additional path coupling the relay node to the donor node via the mobile termination.

The configuration message may be generated based on a determination of a node disjoint path involving the mobile termination, and wherein the additional path is the node disjoint path between the relay node and the donor node.

The means for establishing an additional path coupling the relay node to the one of the at least one donor node via the mobile termination may be further for configuring the additional path for at least one of: signalling radio bearer (SRB) data; data radio bearer (DRB) data; and ultra-reliable low-latency-communication data.

The relay node may be an integrated access and backhaul node.

The at least one donor node coupled to the relay node, and the at least one donor node coupled to the mobile termination may be: a same donor node; different donor nodes.

According to a second aspect there is provided an apparatus for: determining a network configuration, the network comprising at least one donor node, a relay node coupled over a first path to one of the at least one donor node and a mobile termination coupled to at least one of the at least one donor node; configuring, based on the determined network configuration, the relay node with an additional path coupling the relay node to one of the at least one donor node via the mobile termination.

The configuring may be further for configuring the mobile termination to establish a new radio link.

The mobile termination may be part of one of: a user equipment; and an integrated access and backhaul node.

Determining a network configuration may be further for determining a node disjoint path involving the mobile termination wherein the additional path coupling the relay node to the one of the at least one donor node via the mobile termination is further via a further relay node.

The means for configuring may be further for configuring the mobile termination with a first group of serving cells and a second group of serving cells, to receive packets over one of the configured groups of cells and transmit the received packets over the other of the configured groups of cells.

The means for configuring may be further for defining a loop-back radio bearer for the mobile termination for performing receiving and transmitting.

The means for configuring may be further for configuring the additional path for at least one of: signalling radio bearer (SRB) data; data radio bearer (DRB) data; and ultra-reliable low-latency-communication data.

The relay node may be an integrated access and backhaul node.

According to a third aspect there is provided a relay node within a network, the network further comprising a further relay node, at least one donor node coupled to the relay node, and a mobile termination coupled to the relay node and the further relay node, the relay node comprises means for: receiving a configuration message; configuring the relay node, based on the configuration message, to perform at least one of: to receive packets from the mobile termination and originating from the further relay node and to transmit the received packets towards the donor node; and to receive packets originating from the donor node and to forward the received packets towards the further relay node by transmitting them to the mobile termination.

The relay node and the further relay node may be integrated access and backhaul nodes and the mobile termination is part of one of: a user equipment; and an integrated access and backhaul node.

The additional link may be for at least one of: signalling radio bearer (SRB) data; data radio bearer (DRB) data; and ultra-reliable low-latency-communication data.

According to a fourth aspect there is provided a mobile termination within a network, the network further comprising a relay node and at least one donor node wherein the mobile termination is coupled to the relay node, and the relay node is coupled to the at least one donor node, the mobile termination comprising means for: receiving a configuration message, and configuring, based on the configuration message, the mobile termination for relaying packets between the relay node and a further node.

The means for may be further for relaying packets between the relay node and a further node.

The means for relaying packets between the relay node and a further node may be further for receiving packets over a first configured MAC-protocol entity and transmitting the received packets over a second configured MAC-protocol entity The further node may be a donor node.

The further node may be a further relay node.

The first MAC-protocol entity may be configured to receive at least one scheduling grant for transmissions over a first group of serving cells and the second MAC-protocol entity may be configured to receive at least one scheduling grant for transmissions over a second group of serving cells.

The relay node and the further relay node may be integrated access and backhaul nodes and the mobile termination may be a part of at least one of: a user equipment; and an integrated access and backhaul node.

The means for configuring may be further for defining a loop-back radio bearer for performing the receiving and transmitting.

The means for relaying may be for at least one of: signalling radio bearer (SRB) data; data radio bearer (DRB) data; and ultra-reliable low-latency-communication data.

According to a fifth aspect there is provided an apparatus within a network, the network further comprising a relay node and at least one donor node wherein the mobile termination is coupled to the relay node, and the relay node is coupled to the at least one donor node, the apparatus comprising means for: receiving a configuration message, and configuring, based on the configuration message, the apparatus for relaying packets between the relay node and a further node.

The means for may be further for relaying packets between the relay node and a further node.

The means for relaying packets between the relay node and a further node may be further for receiving packets over a first configured MAC-protocol entity and transmitting the received packets over a second configured MAC-protocol entity The further node may be a donor node.

The further node may be a further relay node.

The first MAC-protocol entity may be configured to receive at least one scheduling grant for transmissions over a first group of serving cells and the second MAC-protocol entity may be configured to receive at least one scheduling grant for transmissions over a second group of serving cells.

The relay node and the further relay node may be integrated access and backhaul nodes and the mobile termination may be a part of at least one of: a user equipment; and an integrated access and backhaul node.

The means for configuring may be further for defining a loop-back radio bearer for performing the receiving and transmitting.

The means for relaying may be for at least one of: signalling radio bearer (SRB) data; data radio bearer (DRB) data; and ultra-reliable low-latency-communication data.

The apparatus may be a mobile termination.

According to a sixth aspect there is provided a method for a relay node within a network, the network further comprising at least one donor node coupled to the relay node, and a mobile termination coupled to the relay node and at least one donor node, the method comprising: receiving a configuration message; configuring the relay node, based on the configuration message, to perform at least one of: receiving packets from the mobile termination and originating from one of the donor nodes; and sending packets to one of the donor nodes by transmitting them to the mobile termination.

The mobile termination may be part of one of: a user equipment; and an integrated access and backhaul node.

Configuring the relay node to perform sending packets to one of the donor nodes by transmitting them to the mobile termination may comprise establishing an additional path coupling the relay node to the donor node via the mobile termination.

The configuration message may be generated based on determining a node disjoint path involving the mobile termination, and wherein the additional path is the node disjoint path between the relay node and the donor node.

Establishing an additional path coupling the relay node to the one of the at least one donor node via the mobile termination may further comprise configuring the additional path for at least one of: signalling radio bearer (SRB) data; data radio bearer (DRB) data; and ultra-reliable low-latency-communication data.

The relay node may be an integrated access and backhaul node.

The at least one donor node coupled to the relay node, and the at least one donor node coupled to the mobile termination may be: a same donor node; different donor nodes.

According to a seventh aspect there is provided a method comprising: determining a network configuration, the network comprising at least one donor node, a relay node coupled over a first path to one of the at least one donor node and a mobile termination coupled to at least one of the at least one donor node; configuring, based on the determined network configuration, the relay node with an additional path coupling the relay node to one of the at least one donor node via the mobile termination.

Configuring may further comprise configuring the mobile termination to establish a new radio link.

The mobile termination may be part of one of: a user equipment; and an integrated access and backhaul node.

Determining a network configuration may further comprise determining a node disjoint path involving the mobile termination wherein the additional path coupling the relay node to the one of the at least one donor node via the mobile termination is further via a further relay node.

Configuring may further comprise: configuring the mobile termination with a first group of serving cells and a second group of serving cells; receive packets over one of the configured groups of cells; and transmitting the received packets over the other of the configured groups of cells.

Configuring may further comprise defining a loop-back radio bearer for the mobile termination for performing receiving and transmitting.

Configuring may further comprise configuring the additional path for at least one of: signalling radio bearer (SRB) data; data radio bearer (DRB) data; and ultra-reliable low-latency-communication data.

The relay node may be an integrated access and backhaul node.

According to an eighth aspect there is provided a method for a relay node within a network, the network further comprising a further relay node, at least one donor node coupled to the relay node, and a mobile termination coupled to the relay node and the further relay node, the method comprises: receiving a configuration message; configuring the relay node, based on the configuration message, to perform at least one of: to receive packets from the mobile termination and originating from the further relay node and to transmit the received packets towards the donor node; and to receive packets originating from the donor node and to forward the received packets towards the further relay node by transmitting them to the mobile termination.

The relay node and the further relay node may be integrated access and backhaul nodes and the mobile termination is part of one of: a user equipment; and an integrated access and backhaul node.

The additional link may be for at least one of: signalling radio bearer (SRB) data; data radio bearer (DRB) data; and ultra-reliable low-latency-communication data.

According to a ninth aspect there is provided a method for a mobile termination within a network, the network further comprising a relay node and at least one donor node wherein the mobile termination is coupled to the relay node, and the relay node is coupled to the at least one donor node, the method comprising: receiving a configuration message, and configuring, based on the configuration message, the mobile termination for relaying packets between the relay node and a further node.

The method may further comprise relaying packets between the relay node and a further node.

Relaying packets between the relay node and a further node may further comprise receiving packets over a first configured MAC-protocol entity and transmitting the received packets over a second configured MAC-protocol entity The further node may be a donor node.

The further node may be a further relay node.

The first MAC-protocol entity may be configured to receive at least one scheduling grant for transmissions over a first group of serving cells and the second MAC-protocol entity may be configured to receive at least one scheduling grant for transmissions over a second group of serving cells.

The relay node and the further relay node may be integrated access and backhaul nodes and the mobile termination may be a part of at least one of: a user equipment; and an integrated access and backhaul node.

Configuring may further comprise defining a loop-back radio bearer for performing the receiving and transmitting.

Relaying may further comprise signalling at least one of: signalling radio bearer (SRB) data; data radio bearer (DRB) data; and ultra-reliable low-latency-communication data.

According to a tenth aspect there is provided a method for an apparatus within a network, the network further comprising a relay node and at least one donor node wherein the mobile termination is coupled to the relay node, and the relay node is coupled to the at least one donor node, the method comprising: receiving a configuration message, and configuring, based on the configuration message, the apparatus for relaying packets between the relay node and a further node.

The method may further comprise relaying packets between the relay node and a further node.

Relaying packets between the relay node and a further node may further comprise receiving packets over a first configured MAC-protocol entity and transmitting the received packets over a second configured MAC-protocol entity The further node may be a donor node.

The further node may be a further relay node.

The first MAC-protocol entity may be configured to receive at least one scheduling grant for transmissions over a first group of serving cells and the second MAC-protocol entity may be configured to receive at least one scheduling grant for transmissions over a second group of serving cells.

The relay node and the further relay node may be integrated access and backhaul nodes and the mobile termination may be a part of at least one of: a user equipment; and an integrated access and backhaul node.

Configuring may further comprise defining a loop-back radio bearer for performing the receiving and transmitting.

Relaying may further comprise signalling at least one of: signalling radio bearer (SRB) data; data radio bearer (DRB) data; and ultra-reliable low-latency-communication data.

The apparatus may be a mobile termination.

According to an eleventh aspect there is provided a relay node within a network, the network further comprising at least one donor node coupled to the relay node, and a mobile termination coupled to the relay node and at least one donor node, the relay node comprising at least one processor and at least one memory including a computer program code, the at least one memory and the computer program code configured to, with the at least one processor, cause the relay node at least to: receive a configuration message; configure the relay node, based on the configuration message, to perform at least one of: receive packets from the mobile termination and originating from one of the donor nodes; and send packets to one of the donor nodes by transmitting them to the mobile termination.

According to a twelfth aspect there is provided an apparatus comprising at least one processor and at least one memory including a computer program code, the at least one memory and the computer program code configured to, with the at least one processor, cause the apparatus at least to: determine a network configuration, the network comprising at least one donor node, a relay node coupled over a first path to one of the at least one donor node and a mobile termination coupled to at least one of the at least one donor node; configure, based on the determined network configuration, the relay node with an additional path coupling the relay node to one of the at least one donor node via the mobile termination.

According to a thirteenth aspect there is provided a relay node within a network, the network further comprising a further relay node, at least one donor node coupled to the relay node, and a mobile termination coupled to the relay node and the further relay node, the relay node comprising at least one processor and at least one memory including a computer program code, the at least one memory and the computer program code configured to, with the at least one processor, cause the relay node at least to: receive a configuration message; configure the relay node, based on the configuration message, to perform at least one of: to receive packets from the mobile termination and originating from the further relay node and to transmit the received packets towards the donor node; and to receive packets originating from the donor node and to forward the received packets towards the further relay node by transmitting them to the mobile termination.

According to a fourteenth aspect there is provided a mobile termination within a network, the network further comprising a relay node and at least one donor node wherein the mobile termination is coupled to the relay node, and the relay node is coupled to the at least one donor node, the mobile termination comprising at least one processor and at least one memory including a computer program code, the at least one memory and the computer program code configured to, with the at least one processor, cause the mobile termination at least to: receive a configuration message, and configuring, based on the configuration message, the mobile termination for relaying packets between the relay node and a further node.

According to a fifteenth aspect there is provided an apparatus within a network, the network further comprising a relay node and at least one donor node wherein the mobile termination is coupled to the relay node, and the relay node is coupled to the at least one donor node, the mobile termination comprising at least one processor and at least one memory including a computer program code, the at least one memory and the computer program code configured to, with the at least one processor, cause the mobile termination at least to: receive a configuration message, and configuring, based on the configuration message, the apparatus for relaying packets between the relay node and a further node.

According to a sixteenth aspect there is provided a relay node within a network, the network further comprising at least one donor node coupled to the relay node, and a mobile termination coupled to the relay node and at least one donor node, the relay node comprising a non-transitory computer readable medium comprising program instructions for causing the relay node to perform at least the following: receive a configuration message; configure the relay node, based on the configuration message, to perform at least one of: receive packets from the mobile termination and originating from one of the donor nodes; and send packets to one of the donor nodes by transmitting them to the mobile termination.

According to a seventeenth aspect there is provided a non-transitory computer readable medium comprising program instructions for causing an apparatus to perform at least the following: determine a network configuration, the network comprising at least one donor node, a relay node coupled over a first path to one of the at least one donor node and a mobile termination coupled to at least one of the at least one donor node; configure, based on the determined network configuration, the relay node with an additional path coupling the relay node to one of the at least one donor node via the mobile termination.

According to an eighteenth aspect there is provided a relay node within a network, the network further comprising a further relay node, at least one donor node coupled to the relay node, and a mobile termination coupled to the relay node and the further relay node, the relay node comprising a non-transitory computer readable medium comprising program instructions for causing the relay node to perform at least the following: receive a configuration message; configure the relay node, based on the configuration message, to perform at least one of: to receive packets from the mobile termination and originating from the further relay node and to transmit the received packets towards the donor node; and to receive packets originating from the donor node and to forward the received packets towards the further relay node by transmitting them to the mobile termination.

According to a nineteenth aspect there is provided a mobile termination within a network, the network further comprising a relay node and at least one donor node wherein the mobile termination is coupled to the relay node, and the relay node is coupled to the at least one donor node, the mobile termination comprising a non-transitory computer readable medium comprising program instructions for causing the mobile termination to perform at least the following: receive a configuration message, and configuring, based on the configuration message, the mobile termination for relaying packets between the relay node and a further node.

According to a twentieth aspect there is provided an apparatus within a network, the network further comprising a relay node and at least one donor node wherein the mobile termination is coupled to the relay node, and the relay node is coupled to the at least one donor node, the mobile termination comprising a non-transitory computer readable medium comprising program instructions for causing the mobile termination to perform at least the following: receive a configuration message, and configuring, based on the configuration message, the apparatus for relaying packets between the relay node and a further node.

According to a twenty-first aspect there is provided a relay node within a network, the network further comprising at least one donor node coupled to the relay node, and a mobile termination coupled to the relay node and at least one donor node, the relay node comprising a computer program comprising instructions [or a computer readable medium comprising program instructions] for causing the relay node to perform at least the following: receive a configuration message; configure the relay node, based on the configuration message, to perform at least one of: receive packets from the mobile termination and originating from one of the donor nodes; and send packets to one of the donor nodes by transmitting them to the mobile termination.

According to a twenty-second aspect there is provided a computer program comprising instructions [or a computer readable medium comprising program instructions] for causing an apparatus to perform at least the following: determine a network configuration, the network comprising at least one donor node, a relay node coupled over a first path to one of the at least one donor node and a mobile termination coupled to at least one of the at least one donor node; configure, based on the determined network configuration, the relay node with an additional path coupling the relay node to one of the at least one donor node via the mobile termination.

According to a twenty-third aspect there is provided a relay node within a network, the network further comprising a further relay node, at least one donor node coupled to the relay node, and a mobile termination coupled to the relay node and the further relay node, the relay node comprising a computer program comprising instructions [or a computer readable medium comprising program instructions] for causing the relay node to perform at least the following: receive a configuration message; configure the relay node, based on the configuration message, to perform at least one of: to receive packets from the mobile termination and originating from the further relay node and to transmit the received packets towards the donor node; and to receive packets originating from the donor node and to forward the received packets towards the further relay node by transmitting them to the mobile termination.

According to a twenty-fourth aspect there is provided a mobile termination within a network, the network further comprising a relay node and at least one donor node wherein the mobile termination is coupled to the relay node, and the relay node is coupled to the at least one donor node, the mobile termination comprising a computer program comprising instructions [or a computer readable medium comprising program instructions] for causing the mobile termination to perform at least the following: receive a configuration message, and configuring, based on the configuration message, the mobile termination for relaying packets between the relay node and a further node.

According to a twenty-fifth aspect there is provided an apparatus within a network, the network further comprising a relay node and at least one donor node wherein the mobile termination is coupled to the relay node, and the relay node is coupled to the at least one donor node, the mobile termination comprising a computer program comprising instructions [or a computer readable medium comprising program instructions] for causing the mobile termination to perform at least the following: receive a configuration message, and configuring, based on the configuration message, the apparatus for relaying packets between the relay node and a further node.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Some embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
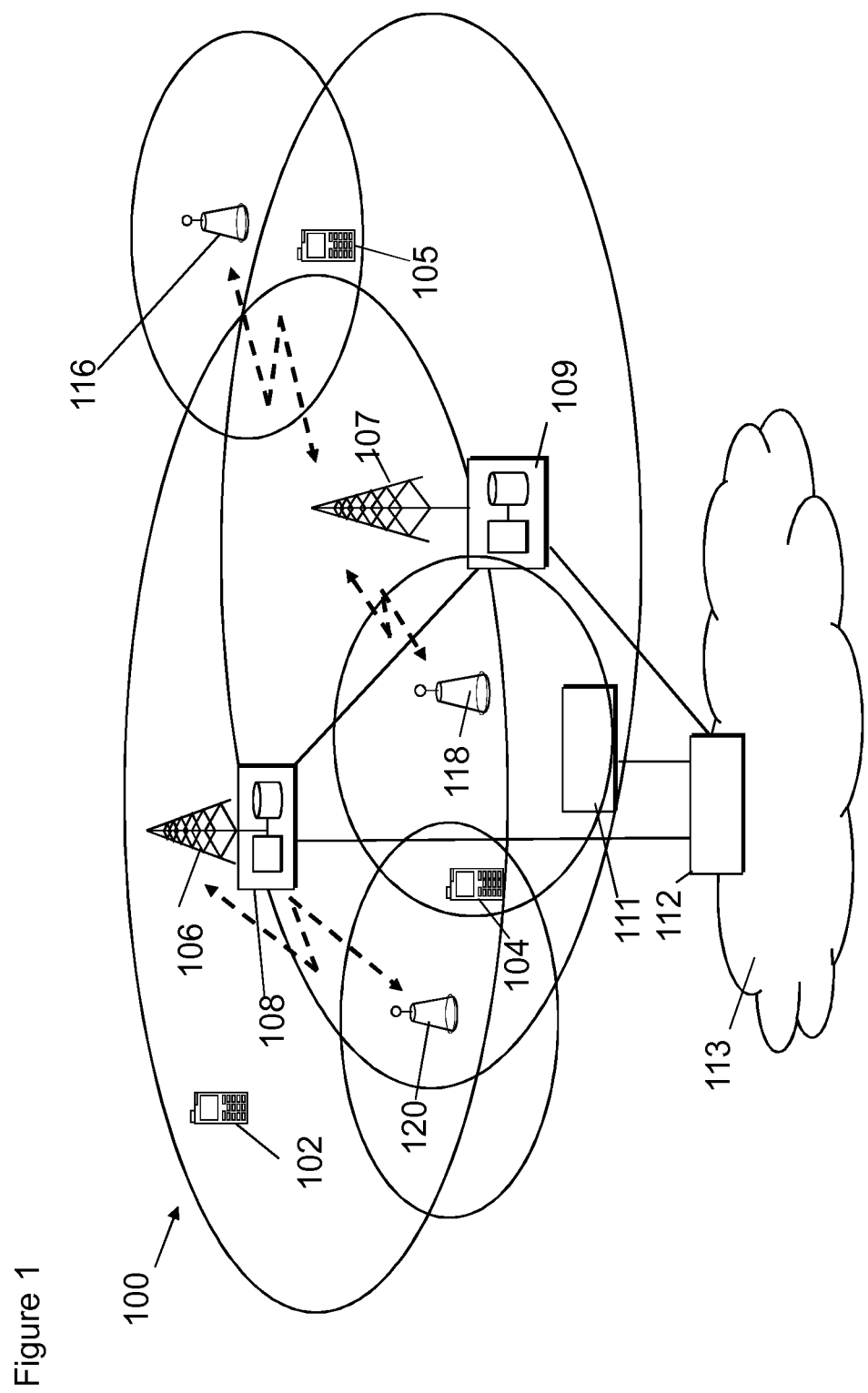
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The relay nodes may be considered to contain some communication device functionality which facilitates backhaul connection between a donor gNB (DgNB) or a serving relay node in the case of a multi-hop scenario. Furthermore, a relay node in this context may comprise wireless backhaul capability. This communication device functionality may be limited to those functions handling the radio link.

That functionality may be referred to as a mobile termination MT function. Furthermore, the relay node may be considered to contain gNB functionality which facilitates access link connection between communication devices within the relay node cell as well as the backhaul connection for relay nodes served by the current relay node (when the relay node is operating as a serving relay node in a multi-hop scenario). The Mobile-Termination (MT) function has been defined a component of the Mobile Equipment. In the context of this study, MT is referred to as a function residing on an IAB-node that terminates the radio interface layers of the backhaul Uu interface toward the IAB-donor or other IAB-nodes.

An example of wireless communication systems are architectures standardized by the 3rd Generation Partnership Project (3GPP). One is often referred to as the 5G NR (new radio) standards. It should be appreciated that whilst some embodiments maybe described in the context of the 5G standards, other embodiments may be used in the context of any other suitable standard.

The 5G NR network may be able to allow network deployment with a relatively low manual effort and a relatively high automated self-configuration. In some situations coverage may be problematic. This may be an issue, for example, on higher frequency bands. In some embodiments, the system may be such that coverage extensions may be provided. In some embodiments, these coverage extensions may be provided with little or no network (re-)planning. In some embodiments, this may be achieved in a relatively fast and/or cost-effective manner.

In the current 5G proposals, capabilities are being specified which enable wireless backhauling for access point sites that do not have a fixed (for example wired and/or fibre) connection to the network. Using a radio connection for backhauling may eliminate the need for cabling of at least some or even all access point sites of the radio network (which can be very dense). This may reduce the initial deployment costs.

It has been proposed that the same carrier be used for both backhaul BH and access links sharing the same radio resources and radio transceivers. This is called self-backhauling. In 3GPP, this is sometimes referred to as integrated access and backhauling (IAB). Frequency bands which may be applicable for IAB are those having sufficient capacity, i.e. large enough carrier bandwidths. Those carriers may be on mm wave bands and are typically TDD (time division duplex) bands. When using TDD bands, the IAB needs to take into account the half-duplex constraint, that is no simultaneous transmission and reception can occur. This is to avoid too much interference between a transmitter and a receiver. There may be two half-duplex scenarios: 1) half-duplex with TDM between access and BH and 2) half-duplex with FDM/SDM between access and backhaul. Depending on the capabilities of the IAB node, a full-duplex approach may be supported alternatively or additionally.

IAB or self-backhauling may need to support multi-hop relaying. In some embodiments, the IAB may support the use of one or more relay nodes. Multi-hop relaying may be where an IAB node may provide a wireless BH link for the next hop IAB node. The serving node providing the BH connection is called a parent node where the node can be either a donor node (with wired network connection), or another IAB node. The served IAB node is called a child node.

Figure 4A:
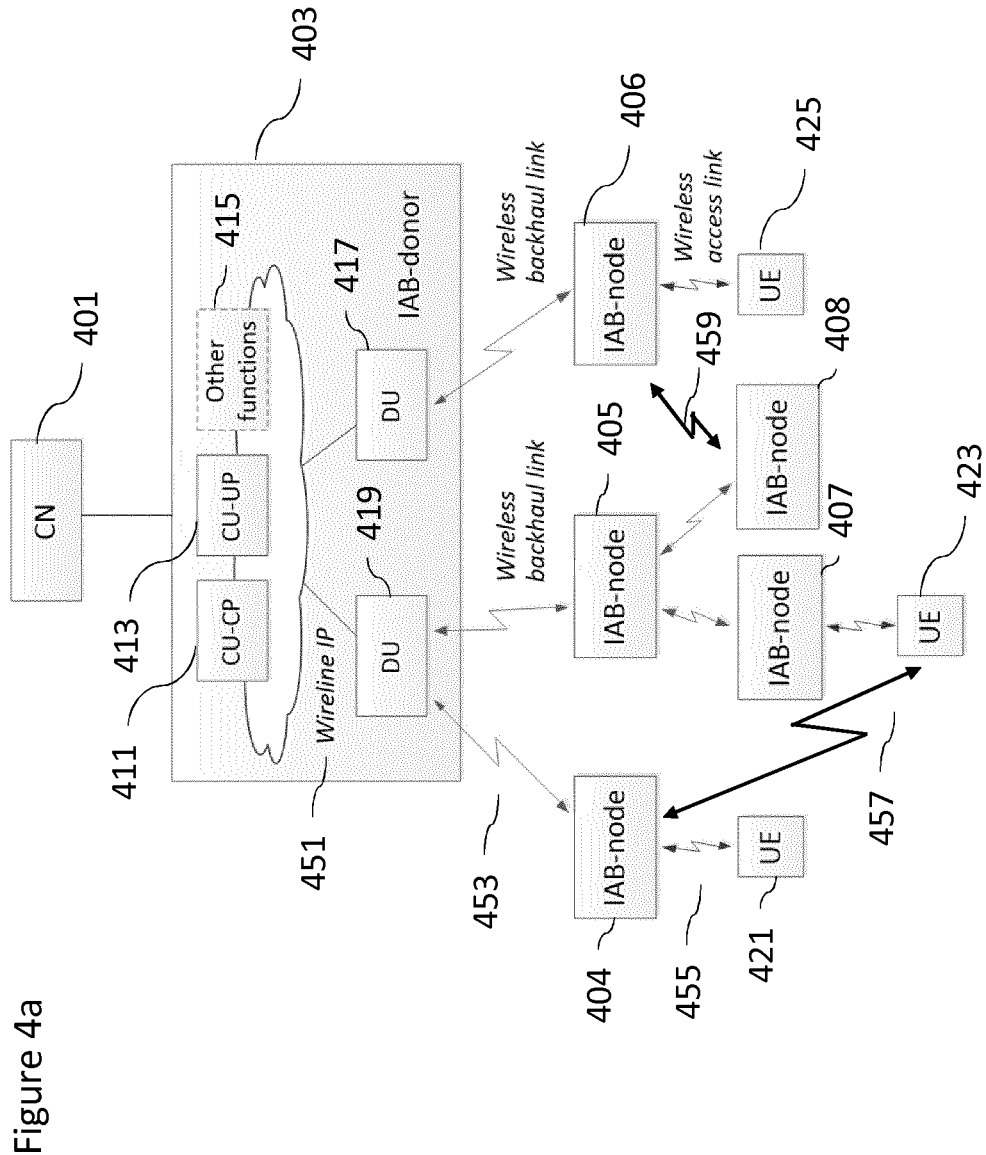
FIGS. 4a to 4d show example integrated access and backhaul (IAB) architecture and backhaul link configurations according to some embodiments.

In this regard, reference is made to FIG. 4a which shows a high level architecture for relaying with a distributed base station, i.e. gNB, architecture.

The architecture shows a core network 401 which is connected to an IAB-donor node 403. The donor node (IAB donor) 403 hosts the centralized unit (CU) for all IAB nodes i.e. it runs RRC (radio resource control), higher L2 (PDCP—packet data convergence protocol) and control functions for the subtending IAB topology. The centralised unit is shown in FIG. 4a as a control plane (CU-CP) function 411, a user plane (CU-UP) function 413 (where the UPF (User Plane Function) is the gateway functionality which is a CN function but can be included in the IAB nodes to establish a PDU (protocol data unit) session between the serving node and the served node MT to carry backhaul) and other functions 415.

Distributed units (DUs) may reside at the IAB-donor node hosting the lower L2 protocol layers (RLC radio link control, MAC medium access control) and physical (PHY) layer. These can be seen in FIG. 4a by a first distributed unit (DU) 419 connected via wireline IP 451 to the centralized unit (CU) and a second distributed unit (DU) 417 also connected to the centralized unit (CU). With this architecture the radio resources usage can be coordinated centrally by the CU of the IAB donor.

Each IAB node has the MT function discussed previously which connects to the parent node (IAB node or Donor DU), as well as a DU function which connects to access UEs and potential next hop IAB node MT function. These connections as discussed previously may be achieved via suitable wireless backhaul link 453 connections from IAB nodes. In some architectures each IAB node parent has one or more IAB child nodes. These links are shown as one-to-one links, but there may be many of these one to one links. For example as shown in FIG. 4a Donor gNB-DU 419 is a parent node for IAB nodes 404 and 405 and Donor gNB-DU 417 is a parent node for IAB node 406, IAB node 405 is parent to IAB nodes 407 and 408 and IAB node 406 is a parent node to IAB node 408.

However in some architectures an IAB node child may have two or more IAB node parents. This is shown in FIG. 4a where IAB node 408 is a child node for IAB nodes 405 and 406.

In the following a higher hop may be understood to be the communications from an apparatus and a further apparatus towards the donor access node, for example a communications hop between a relay node and a donor access node, and a lower hop may be understood to be the communications from an apparatus and a further apparatus towards the user equipment, for example a communications hop between a relay node acting as a serving relay node and a further relay node.

The relay nodes 116, 118 and 120 may be IAB nodes (operating on a macro, pico or femto level) or the like. In the example, relay node 120 is connected via a wireless link to antenna 106 coupled to controller apparatus 108 and gateway 111 whilst station 118 connects via the antenna 107 to controller apparatus 109. The station 116 may be connected via antenna 107 and controller 109

In some embodiments, frequency bands of the order of millimetre waves may be used. Alternatively or additionally, lower frequency bands may be supported.

In some embodiments, a radio frequency beamforming architecture may be used at one or both of the gNB/IAB node and communications device.

Some embodiments may primarily use TDD. Alternatively or additionally, an FDD scenario may be supported.

In some embodiments, self-backhaul or in-band relay may be primarily used. However, in some embodiments, out-band relay may be supported as well.

With respect to FIG. 1 also a communications device or user equipment 102, 104 and 105 are shown. The user equipment may be configured to communicate to the base stations 106, 118 and 120, 116 and 107 respectively.

Figure 2:
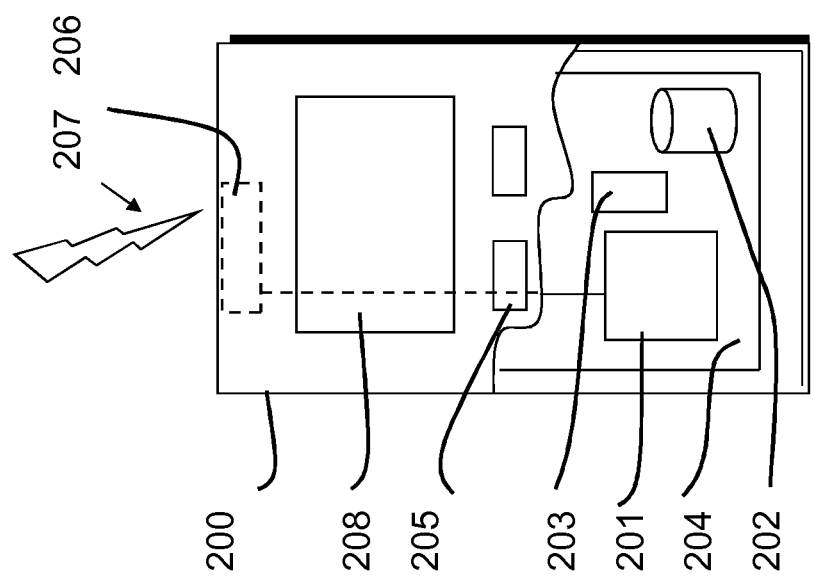
FIG. 2 shows a schematic diagram of an example mobile communication device.

A possible communication device will now be described in more detail with reference to FIG. 2 showing a schematic, partially sectioned view of a communication device 200. Such a communication device is often referred to as user equipment (UE) or terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine type devices or any combinations of these or the like.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

A user may control the operation of the device by means of a suitable user interface such as key pad 205, voice commands, touch sensitive screen or pad, combinations thereof or the like. This may be optional in some embodiments.

A display 208, a speaker and a microphone can be also provided. Again this may be optional.

The communication devices 102, 104, 105 may access the communication system based on various access techniques. In some embodiments the relaying operation may be transparent to the UE.

Figure 3:
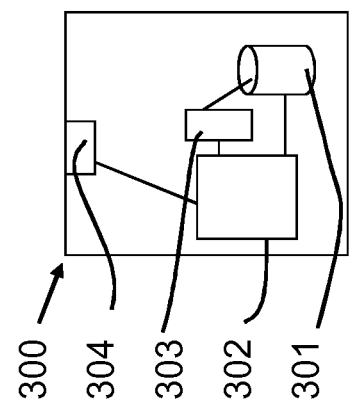
FIG. 3 shows a schematic diagram of an example control apparatus.

An example control apparatus is shown in FIG. 3. FIG. 3 shows an example of a control apparatus provided in a base station, an IAB node, or access point or relay node. The control apparatus 300 comprises at least one memory 301, at least one data processing unit 302, 303 and an input/output interface 304. Via the interface the control apparatus can be coupled to a receiver and a transmitter. The receiver and/or the transmitter may be implemented as a radio front end or a remote radio head. For example, the control apparatus 300 or processor 302/303 can be configured to execute an appropriate software code to provide the control functions. As described above an IAB node may comprise one or more distributed units (DUs) hosting the lower L2 protocol layers (RLC radio link control, MAC medium access control) and physical (PHY) layer. The DU function may be configured to connect to access UEs and potential next hop IAB nodes. Additionally, each IAB node may have the MT function which connects to the parent node (for example a further IAB node or Donor DU).

These connections as discussed previously may be achieved via suitable wireless backhaul link connections from IAB nodes.

As shown in FIG. 4a although a UE may be connected via a wireless access link 455 to a single IAB node such as shown by UE 421 connected to IAB node 404 (and furthermore UE 425 connected to IAB node 406) in some circumstances the UE may be connected to more than one IAB node as shown by UE 423 being connected to IAB node 407 and IAB node 404.

One of the aspects of 5G New Radio (NR) is the physical layer design and related NR functionalities for enhanced mobile broadband (eMBB) and ultra-reliable low-latency-communication (URLLC). The NR under this work item (NR Phase I) should consider frequency ranges up to 52.6 GHz. It is expected that NR work continues after Phase I with various enhancements, including also frequency ranges larger or smaller than 52.6 GHz. The 5G NR should be able to allow network deployment with minimized manual efforts and as automated self-configuration as possible. Especially on higher frequency bands the coverage may be an issue and specific capabilities are needed for NR to enable easy coverage extension with minimized/none requirements for network (re-)planning in a fast and cost-effective manner.

NR thus (and mainly for these reasons) has the requirement to support self-backhauling where the same carrier is used for the backhaul connection and the access links which enables in-band backhaul operation. A specific relaying node can be used to provide wireless backhaul connection (instead of having a wired connection) to a base station with fixed connection to the network backhaul. The serving base station(s) (or depending on the IAB architecture, other network node controlling the resource usage) then may have the overall control of the usage of the radio resources considering both access and backhaul links.

The considered self-backhauling scenarios include both frequency division duplex (FDD) and time division duplex (TDD). TDD operates on unpaired spectrum. A typical assumption for relay operation is that the IAB node cannot transmit and receive at the same time at least towards the same direction. This is called the half-duplex constraint.

From aspects of reliability and redundancy, one desired property for a node in an IAB network (either an IAB node or a UE connected over IAB nodes) is that the node has more than one node-disjoint paths (NDPs) to the fixed network (to the DU, CU, or different CUs).

One example use case is the provisioning of highly reliable connections where all traffic is sent duplicated over such NDPs. For a node to have NDPs, it needs to be connected to at least two other nodes. However, an IAB node being multi-connected to more than one other nodes comes at a cost, since the use of the radio resource needs to be split among more links than would otherwise be necessary.

A UE served by IAB nodes can have NDPs even if no IAB node has them. An example is when the IAB nodes together with the fixed-network point of attachment form a tree topology, and the UE is connected via (at least) two different children of the tree root i.e. the fixed network. In FIG. 4a, UE 423 is dual connected via node disjoint paths to Donor DU 419 which has wired (fixed) connection to Donor CU.

This causes a higher consumption of radio resources due to the increased number of connections/links for same amount of data/information intended for UE.

In the following discussions the concept as discussed in the embodiments herein is the provision of NDPs to IAB nodes while avoiding, or minimizing the number of, dual- or multi-connected IAB nodes and the resource cost that comes with them.

This concept summarised is one where a UE that is dual- or multi-connected to more than one nodes where at least one node is an IAB node, is configured to relay traffic between the IAB node and the other node(s). This can have the desired effect that IAB nodes obtain NDPs characteristics without the resource costs from multi-connected IAB nodes.

The embodiments may be configured such that a topology-management function of the IAB network is able to detect the need for a redundant path and furthermore to cause the donor IAB to configure the redundant route in the nodes involved (the IAB node and the UE).

In such embodiments a UE or IAB node on the redundant route is configured to obtain a "loop-back radio bearer" for forwarding messages along the redundant route. Furthermore, in some embodiments the donor node is configured to trigger the IAB node as to when to start duplication/forwarding of traffic on the redundant path.

In some embodiments the UE can also be the mobile-terminal side of an IAB node, which is dual- or multi-connected.

Figure 4B:
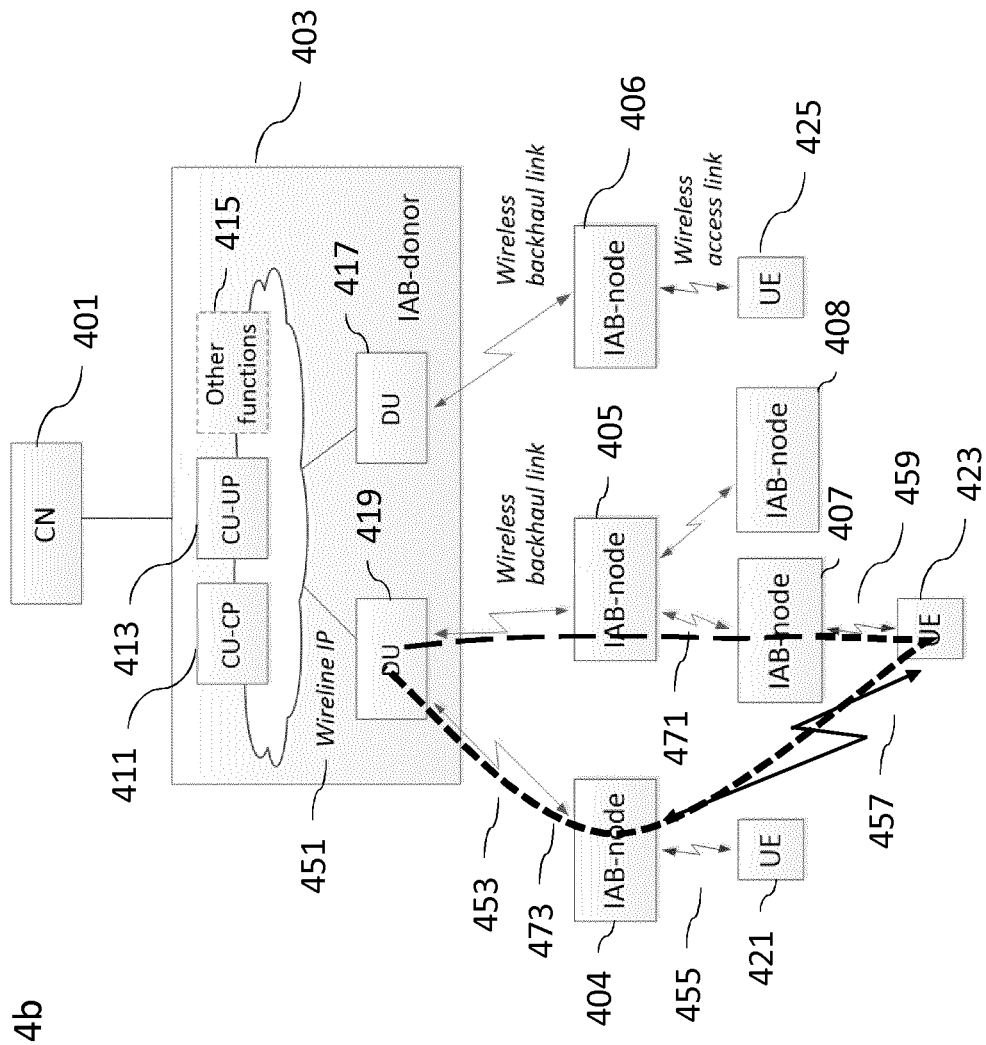
Figure 5A:
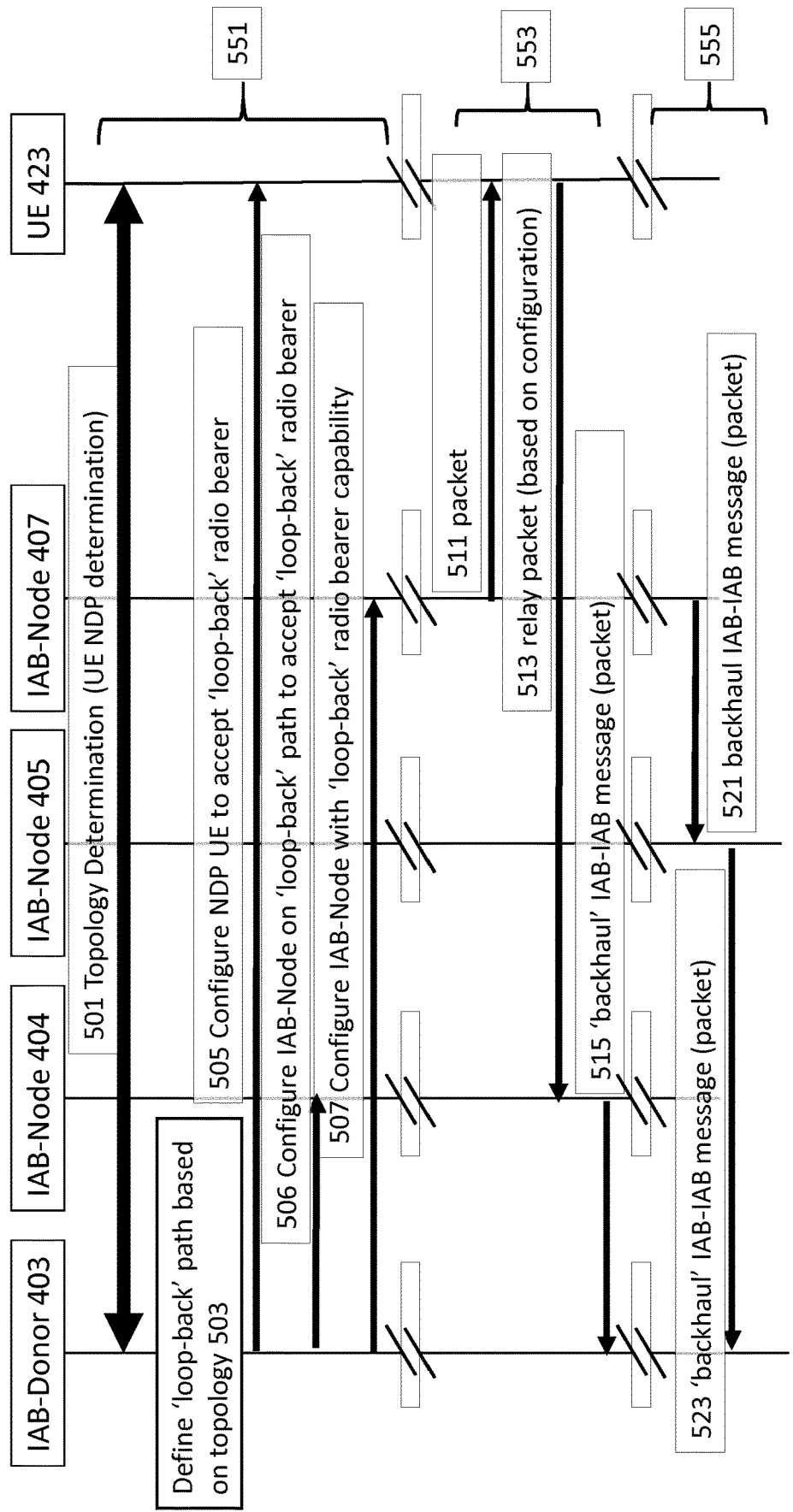
FIG. 5a shows a flow diagram of example multi-connected UE loop-back bearer configuration, loop-back bearer IAB operation and IAB operation based on the integrated access and backhaul (IAB) architecture shown in FIGS. 4a and 4b according to some embodiments.

With respect to FIGS. 4b and 5a a first example of the embodiments is described.

FIG. 4b shows an example IAB architecture suitable for implementing some embodiments and FIG. 5a shows a flow diagram of the operations of the IAB nodes and the UE in implementing some embodiments with respect to a dual connected UE configured to enable an IAB node to have NDPs to the donor node.

For example, with respect to IAB node 407 there is shown a regular uplink path, the long dashed path 471, which passes via a wireless backhaul link to a IAB node 405 and then via a further wireless backhaul link to the IAB donor node 403, in particular, to the Donor DU 419. Then any data may then be coupled via the wireline link 451 to the CU-UP 413 (and any signalling coupled via the wireline link 451 to the CU-CP 411) from which communication to the core network 401 can be made. Additionally because of the dual connection of the UE 423 connected via a first wireless access link to IAB node 407 and also connected via a second wireless access link to IAB node 404 a second loop-back path, shown as the short dash path 473, which comprises a first wireless (downlink) access link 459 to the UE 423, a second wireless (uplink) access link 457 from the UE 423 to the IAB node 404, a wireless backhaul link from the IAB node 404 to the IAB donor node 403 and the Donor DU 419. The data may then be coupled via the wireline link 451 to the CU-UP 413 (and any signalling coupled via the wireline link 451 to the CU-CP 411) from which communication to the core network 401 can be made as indicated before.

In such a manner in some embodiments the UE 423 can be configured with a radio bearer where downlink packets received by one MAC-protocol entity in the UE over master cell group/secondary cell group (MCG/SCG) are looped back as uplink packets transmitted by another MAC-protocol entity in the UE over the secondary cell group/master cell group (SCG/MCG) respectively.

In the example shown in FIG. 4b shows the combination of the disjoint paths within the DU 419, in other words both paths can combine at the DU 419. With respect to FIG. 4d a further arrangement is shown wherein the combination of the disjoint paths takes place within the CU-CP 411 (with respect to control or signalling information). It would be understood that in some embodiments this combination may occur within the CU-UP 413 with respect to data information.

With respect to the upper section 551 of FIG. 5a is shown an example of the configuration or operation of some embodiments as represented by the network shown in FIG. 4b.

In some embodiments the IAB donor 403 is configured to obtain or determine the network topology as shown in FIG. 5a by step 501.

Having determined or obtained the topology the IAB donor 403 may be configured to determine or define a suitable "loop-back" path based on the determined topology of the network identifying a suitable NDP UE 423 as shown in FIG. 5a by step 503.

In some embodiments the IAB donor 403 is configured to transmit a suitable configuration message to the NDP UE 423 to configure a "loop-back" radio bearer and then to receive by one MAC-protocol entity in the UE downlink packets on that "loop-back" radio bearer over a master cell group/secondary cell group (MCG/SCG) and loop these packets back as uplink packets by another MAC-protocol entity in the UE over the secondary cell group/master cell group (SCG/MCG) respectively. This is shown in FIG. 5a by step 505.

In some embodiments the IAB donor 403 is optionally configured to transmit a suitable configuration message to the IAB node 404 on the "loop-back" path to be able to implement the "loop-back" path when receiving a suitable communication from the UE performing the "loop-back". This is shown in FIG. 5a by step 506.

In some embodiments the IAB donor 403 may furthermore be optionally configured to transmit suitable further configuration messages (or to utilize the configuration messages described above) to the IAB node 404 and/or IAB node 407 in order to implement the 'reverse' of the "loop-back" path, in other words from IAB node 404 to the UE 423 and then to the IAB node 407.

Additionally in some embodiments the IAB donor 403 is configured to transmit a suitable configuration message to the IAB node 407 connected to the NDP UE 423 to be able to utilize a "loop-back" path which can be relayed by the UE by performing the "loop-back". This is shown in FIG. 5a by step 507.

The middle section 553 of FIG. 5a shows the utilization of the "loop-back" path.

In this example the IAB node 407 is configured to generate a suitable packet from the IAB node 407 to the NDP UE 423 as shown in FIG. 5a by step 511. In this example the IAB node 407 may provide a master cell group connection to the UE.

On the configured loop-back radio bearer, the NDP UE 423 is then configured to receive the packet and relay it to the IAB node 404 as shown in FIG. 5a by step 513.

In this example the IAB node 404 may provide a secondary cell group connection to the UE. However, if the downlink reception by the UE occurs via its secondary cell group connection then the uplink transmission occurs via its master cell group connection. In other words, although this example shows a "loop-back" from the IAB node 407 it is understood that a further "loop-back" may be made from the IAB node 404 (to the UE and then to IAB node 407).

The IAB node 404 may then be configured to receive the packet and then generate a suitable backhaul message transmitting the data to the IAB donor 403 as shown in FIG. 5a by step 515.

The lower section 555 of FIG. 5a shows the normal backhaul message steps which may be implemented in parallel with the "loop-back" messages.

The IAB node 407 is configured to generate suitable backhaul messages and transmit these to the IAB node 405 as shown in FIG. 5a by step 521.

The IAB node 405 is configured to receive the backhaul message and forward this via further message to the IAB donor 403 as shown in FIG. 5a by step 523.

The new bearer type as defined herein is called the "loop-back" bearer but may be designated as any suitable other name. In these embodiments the bearer is configured only when at least one of the nodes to which a UE is dual/multi-connected, is an IAB node, i.e., having wireless backhaul connection.

In some embodiments the new bearer type is employed for a limited amount of packets. For example, in some embodiments the bearer is limited to forwarding high priority traffic such as signalling (SRB) or some delay critical data bearer, like ultra-reliable low latency (URLLC) or voice over internet protocol (VoIP).

In some embodiments the new bearer type could be configured also for an IAB node that is dual/multi-connected to other IAB nodes. For such an IAB node, the new bearer type would indicate that the traffic received from the parent IAB node is not forwarded to a child IAB node but instead forwarded to another parent IAB node. In some embodiments, the new bearer type is configured for the MT part of the IAB node.

Figure 4C:
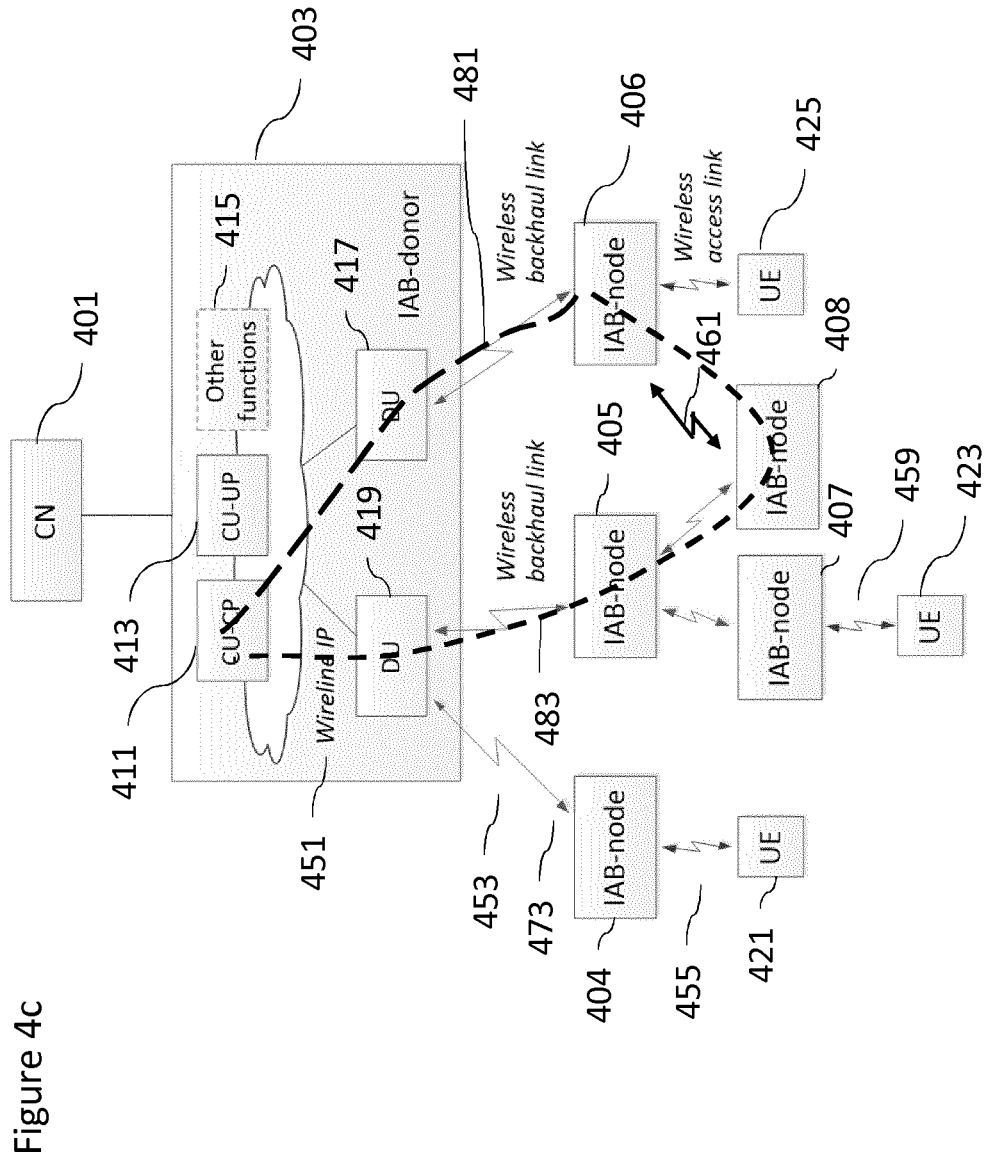
Figure 4D:
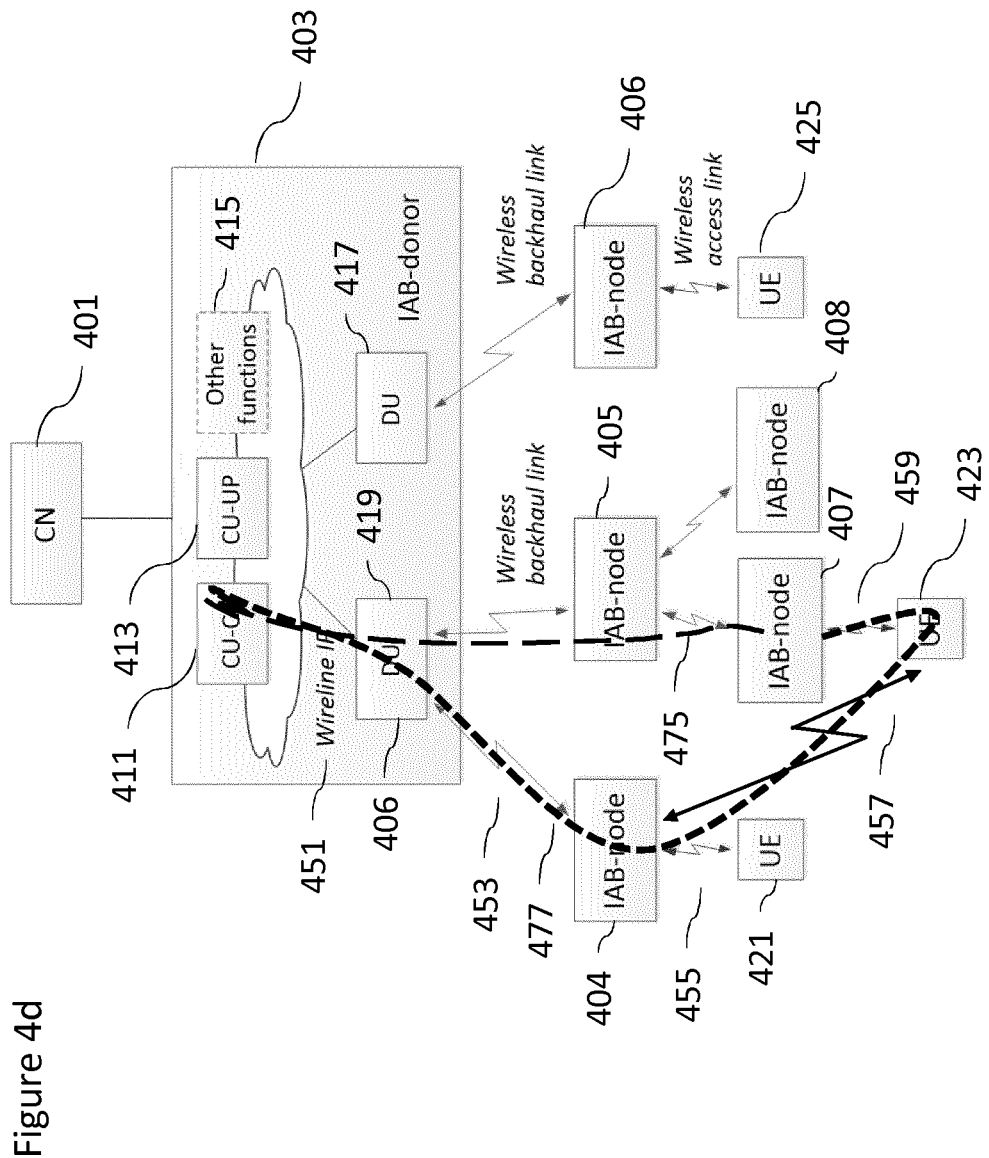
Figure 5B:
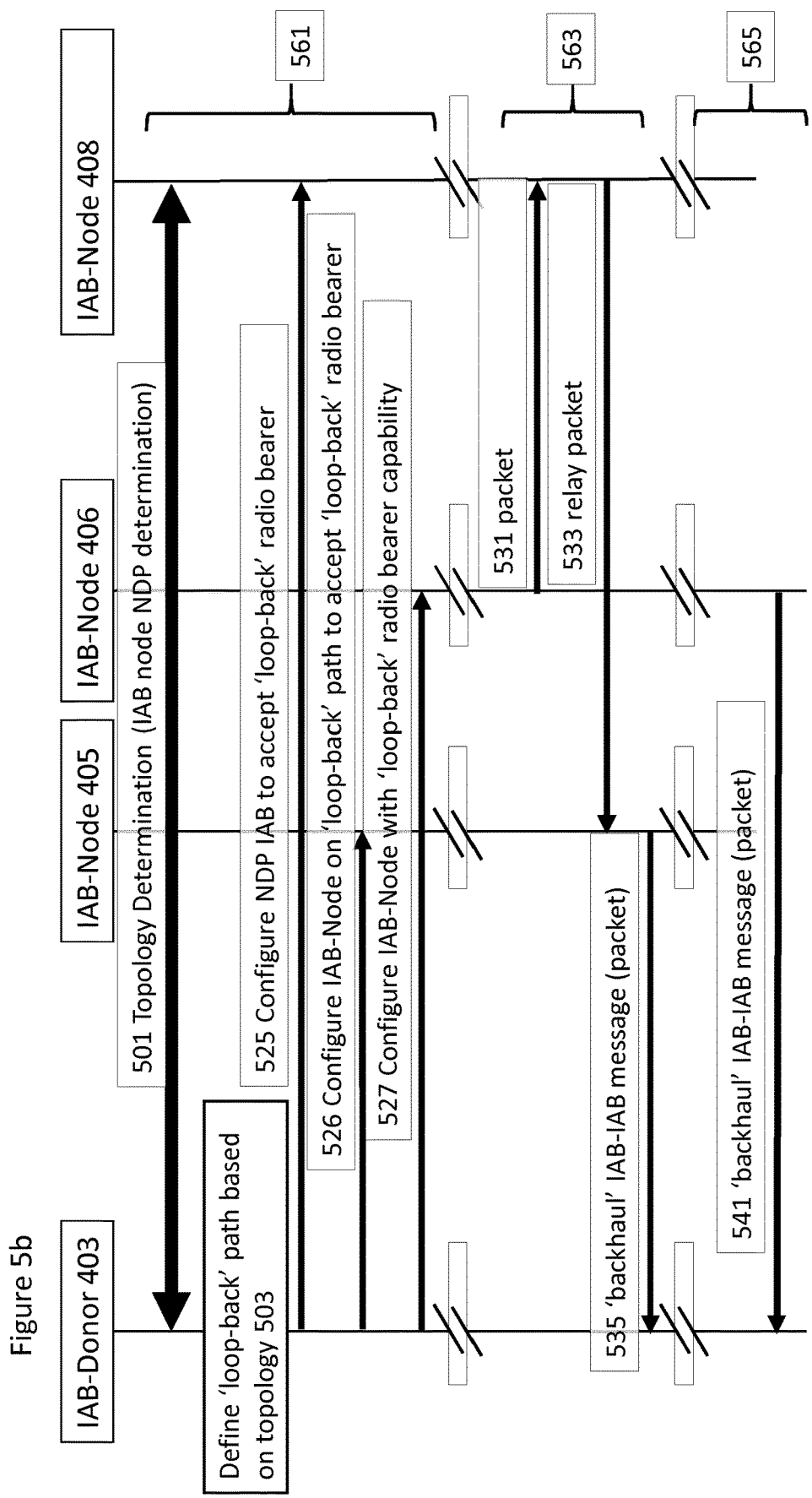
FIG. 5b shows a flow diagram of example multi-connected IAB node loop-back bearer configuration, loop-back bearer IAB operation and IAB operation based on the integrated access and backhaul (IAB) architecture shown in FIGS. 4a and 4c according to some embodiments.

This is for example shown with respect to FIGS. 4c and 5b. FIG. 4c shows an example IAB architecture suitable for implementing some embodiments and FIG. 5b shows a flow diagram of the operations of the IAB nodes in implementing some embodiments with respect to a dual connected IAB configured to enable the IAB node to have NDPs to the donor node.

For example, with respect to IAB node 406 there is shown a regular uplink path, the long dashed path 481, which passes via a wireless backhaul link to the IAB donor node 403 and DU 417. Then any data may then be coupled via the wireline link to the CU-UP 413 (and any signalling coupled via the wireline link to the CU-CP 411) from which communication to the core network 401 can be made. Additionally because of the dual connection of the IAB node 408 connected via a first wireless backhaul link to IAB node 406 and also connected via a second wireless backhaul link to IAB node 405 a second loop-back path, shown as the short dash path 483, which comprises a first wireless (downlink) link 461 to the IAB node 408, a second wireless (uplink) backhaul link from the IAB node 408 to the IAB node 405, and a wireless backhaul link from the IAB node 405 to the IAB donor node 403 and DU 419. Then any data may then be coupled via the wireline link to the CU-UP 413 (and any signalling coupled via the wireline link to the CU-CP 411) from which communication to the core network 401 can be made. The two paths can be combined in the CU-UP (if it is for data radio bearers) or in the CU-CP (if it is for signalling radio bearers).

In such a manner in some embodiments the IAB node 408 can be configured with a radio bearer where downlink packets received over a primary/secondary link are looped back as uplink packets over the secondary/primary link respectively.

With respect to the upper section 561 of FIG. 5b is shown an example of the configuration of this mechanism.

In some embodiments the IAB donor 403 is configured to obtain or determine the network topology as shown in FIG. 5b by step 501.

Having determined or obtained the topology the IAB donor 403 may be configured to determine or define a suitable "loop-back" path based on the determined topology of the network identifying a suitable NDP IAB node 408 as shown in FIG. 5b by step 503.

In some embodiments the IAB donor 403 is configured to transmit a suitable configuration message to the NDP IAB node 408 to configure/accept a "loop-back" radio bearer and then on that "loop-back" radio bearer to receive downlink packets over a primary/secondary link and loop these packets back as uplink packets over the secondary/primary link, respectively. This is shown in FIG. 5b by step 525.

In some embodiments the IAB donor 403 is optionally configured to transmit a suitable configuration message to the IAB node 405 on the "loop-back" path to be able to implement the "loop-back" path when receiving a suitable communication from the IAB node 408 performing the "loop-back". This is shown in FIG. 5b by step 526.

In some embodiments the IAB donor 403 may furthermore be optionally configured to transmit suitable further configuration messages (or to utilize the configuration messages described above) to the IAB node 405 and/or IAB node 406 in order to implement the 'reverse' of the "loop-back" path, in other words from IAB node 405 to the IAB node 408 and then to the IAB node 406.

Additionally in some embodiments the IAB donor 403 is configured to transmit a suitable configuration message to the IAB node 406 connected to the NDP IAB node 408 to be able to utilize a "loop-back" path which can be relayed by the IAB node 408 by performing the "loop-back". This is shown in FIG. 5b by step 527.

The middle section 563 of FIG. 5b shows the utilization of the "loop-back" path.

In this example the IAB node 406 is configured to generate a suitable packet from the IAB node 406 to the NDP IAB node 408 as shown in FIG. 5b by step 531.

On the configured loop-back radio bearer, the NDP IAB node 408 is then configured to receive the packet and relay it to the IAB node 405 as shown in FIG. 5b by step 533. The relayed packet has to indicate somehow that it is coming from IAB node 406. This indication may, however, not be visible to IAB node 405 when it receives and also forwards the packet. Thus in some embodiments the relayed packet may be a normal BH message but the "system" has knowledge of the origin (although node 405 may not have).

In other words although this example shows a "loop-back" from the IAB node 406 it is understood that a further "loop-back" may be made from the IAB node 405 (to the IAB node 408 and then to IAB node 406).

The IAB node 405 may then be configured to receive the packet and then generate a suitable backhaul message transmitting the data to the IAB donor 403 as shown in FIG. 5b by step 535.

The lower section 565 of FIG. 5b shows the normal backhaul message steps which may be implemented in parallel with the "loop-back" messages.

The IAB node 406 is configured to generate suitable backhaul messages and transmit these to the IAB donor 403 as shown in FIG. 5b by step 541.

In some cases, in an IAB node the "loop-back" function may be arranged without the new bearer type by implementing suitable routing mechanisms which would allow routing from a parent to another parent.

However the new bearer type may be more efficient in the case where the UE/MT part of the IAB node handles both the reception and the forwarding of the traffic.

In some embodiments the IAB donor is further configured to release a redundant path by the IAB donor generating a further configuration message.

In the above examples the MT, shown as the UE 423 in FIGS. 4a to 4d is shown connected to the DU 419 via at least one IAB node (for example IAB-node 404). However, in some embodiments the MT may be directly coupled to the donor node DU.

Furthermore, in some embodiments there may be more than one donor involved. For example, where there is dual connectivity with two DgNBs. Thus, in some embodiments a relay node (for example such as shown in FIGS. 4a to 4d by IAB-node 407) could be connected to a donor node (say IAB-donor node 403) but the UE 423 could be connected to another donor node. The combination point in this situation is at one of the two donor nodes.

It should be understood that each block of the flowchart of the Figures and any combination thereof may be implemented by various means or their combinations, such as hardware, software, firmware, one or more processors and/or circuitry.

In the embodiments as discussed above coupled does not necessarily mean a single-link connection but may also cover a connection over a path that may consist of multiple consecutive links.

It is noted that whilst embodiments have been described in relation to one example of a 5G network, similar principles maybe applied in relation to other examples of networks. It should be noted that other embodiments may be based on other standards other than 3GPP standards. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention. For example, the order of the configuration messages may be changed.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A relay node within a network, the network further comprising at least one donor node coupled to the relay node, and a mobile termination comprising another relay node and coupled to the relay node and the at least one donor node, the relay node comprising at least one processor and at least one memory including computer program code, the at least one memory and the computer program code configured to, with the at least one processor, cause the relay node at least to:
   receive a configuration message; and
   configure the relay node, based on the configuration message, to perform:
   receiving packets from the mobile termination and originating from a donor node of the at least one donor node; and
   sending packets to the donor node of the at least one donor node by transmitting them to the mobile termination by establishing an additional path coupling the relay node to the donor node via the mobile termination,
   wherein the mobile termination with which the relay node communicates is configured to terminate radio interface layers of a backhaul interface toward the relay node or the at least one donor node.

2. The relay node as claimed in claim 1, wherein the configuration message is generated based on a determination of a node disjoint path involving the mobile termination, and wherein the additional path is the node disjoint path between the relay node and the donor node.

3. The relay node as claimed in claim 1, wherein the relay node is an integrated access and backhaul node.

4. The relay node as claimed in claim 1, wherein the at least one donor node coupled to the relay node, and the at least one donor node coupled to the mobile termination are:
   a same donor node; or
   different donor nodes.

5. An apparatus comprising at least one processor and at least one memory including computer program code, the at least one memory and the computer program code configured to, with the at least one processor, cause the apparatus at least to:
   determine, via a donor node, a network configuration of a network, the network comprising (i) one or more donor nodes comprising the donor node, (ii) a relay node coupled over a first path to one of the one or more donor nodes and (iii) a mobile termination comprising another relay node and coupled to at least one of the one or more donor nodes; and
   configure, via the donor node, based on the determined network configuration, the relay node with an additional path coupling the relay node to one of the one or more donor nodes via the mobile termination,
   wherein the mobile termination is configured to terminate radio interface layers of a backhaul interface toward the donor node or the relay node.

6. The apparatus as claimed in claim 5, wherein the at least one memory and the computer program code are configured to, with the at least one processor, cause the apparatus to configure the relay node by configuring the mobile termination to establish a new radio link.

7. The apparatus as claimed in claim 5, wherein the at least one memory and the computer program code are configured to, with the at least one processor, cause the apparatus to determine a network configuration by determining a node disjoint path involving the mobile termination.

8. The apparatus as claimed in claim 7, wherein the additional path is the node disjoint path between the relay node and the one of the at least one donor node.

9. The apparatus as claimed in claim 5, wherein the at least one memory and the computer program code are further configured to, with the at least one processor, cause the apparatus to configure the mobile termination with a first group of serving cells and a second group of serving cells, to receive packets over one of the configured groups of cells and transmit the received packets over the other of the configured groups of cells.

10. The apparatus as claimed in claim 5, wherein the relay node is an integrated access and backhaul node.

11. A relay node within a network, the network further comprising a further relay node, at least one donor node coupled to the relay node, and a mobile termination comprising another relay node and coupled to the relay node and the further relay node, the relay node comprising at least one processor and at least one memory including computer program code, the at least one memory and the computer program code configured to, with the at least one processor, cause the relay node at least to:

receive a configuration message; and configure the relay node, based on the configuration message, to receive packets from the mobile termination and originating from the further relay node and to transmit the received packets towards a donor node of the at least one donor node via an additional path coupling the further relay node to the donor node via the mobile termination, wherein the mobile termination with which the relay node communicates is configured to terminate radio interface layers of a backhaul interface toward the relay node or the at least one donor node.

12. The relay node as claimed in claim 11, wherein the relay node and the further relay node are integrated access and backhaul nodes and the mobile termination comprises the another relay node that is part of one of:

an integrated access and backhaul node.

13. The relay node as claimed in claim 11, wherein the additional path is a node disjoint path involving the mobile termination and extending between the further relay node and the donor node.

14. A mobile termination within a network, the network further comprising a relay node and at least one donor node, wherein the mobile termination comprises another relay node and is coupled to the relay node, and the relay node is coupled to the at least one donor node, the mobile termination comprising at least one processor and at least one memory including computer program code, the at least one memory and the computer program code configured to, with the at least one processor, cause the mobile termination at least to:

receive a configuration message, and configure, based on the configuration message, the mobile termination for relaying packets between the relay node and a further relay node via an additional path coupling the further relay node to the at least one donor node via the mobile termination, wherein the mobile termination is configured to terminate radio interface layers of a backhaul interface toward the relay node or the at least one donor node.

15. The mobile termination as claimed in claim 14, wherein the at least one memory and the computer program code are configured to, with the at least one processor, cause the mobile termination to relay packets by receiving packets over a first configured medium access control (MAC)-protocol entity and transmitting the received packets over a second configured MAC-protocol entity.

16. The mobile termination as claimed in claim 15, wherein the first MAC-protocol entity is configured to receive at least one scheduling grant for transmissions over a first group of serving cells and the second MAC-protocol entity is configured to receive at least one scheduling grant for transmissions over a second group of serving cells.

17. The mobile termination as claimed in claim 14, wherein the mobile termination comprises the another relay node that is part of one of:

an integrated access and backhaul node.

* * * * *